United States Patent [19]

Kawamura et al.

[11] Patent Number: 4,930,546
[45] Date of Patent: Jun. 5, 1990

[54] HEAT-INSULATING METAL-CERAMIC STRUCTURE

[75] Inventors: Mitsuyoshi Kawamura; Masato Taniguchi, both of Aichi, Japan

[73] Assignee: NGK Spark Plug Co., Ltd., Aichi, Japan

[21] Appl. No.: 801,962

[22] Filed: Nov. 26, 1985

[30] Foreign Application Priority Data

Nov. 27, 1984 [JP] Japan .................................. 59-249990

[51] Int. Cl.⁵ ............................................. F16L 9/14
[52] U.S. Cl. ................................................... 138/149
[58] Field of Search ............... 138/149, 111, 112, 113, 138/114; 29/455 R, 614–616; 501/94, 96

[56] References Cited

U.S. PATENT DOCUMENTS

| | | | |
|---|---|---|---|
| 1,669,385 | 5/1928 | Wiegand et al. | 29/614 |
| 2,577,080 | 12/1951 | Glenn | 29/616 |
| 3,330,034 | 7/1967 | Price | 29/615 |
| 3,715,265 | 2/1973 | Allen et al. | 138/149 |
| 4,252,768 | 2/1981 | Perkins et al. | 501/97 |
| 4,264,547 | 4/1981 | de Pous | 501/97 |
| 4,410,013 | 10/1983 | Sasaki et al. | 138/149 |
| 4,453,570 | 6/1984 | Hutchison | 138/149 |
| 4,590,971 | 5/1986 | Webster et al. | 138/149 |

FOREIGN PATENT DOCUMENTS 2803316  8/1979  Fed. Rep. of Germany ...... 138/114

Primary Examiner—Henry J. Recla
Attorney, Agent, or Firm—Finnegan, Henderson, Farabow, Garrett and Dunner

[57] ABSTRACT

A metal-ceramic heat-insulating structure having a metallic tubular member fitted with a hollow cylindrical sintered ceramic, the inner surface of which is to be exposed to elevated temperatures. The sintered ceramic is bound to the metallic tubular member by means of a ceramic powder compacted in a gap located between the two members.

5 Claims, 1 Drawing Sheet

HEAT-INSULATING METAL-CERAMIC STRUCTURE

BACKGROUND OF THE INVENTION

1. Field of the Invention

The present invention is suitable for application to cylinder liners and auxiliary combustion chambers in internal combustion engines, to crucibles and to other hollow structures that require heat insulation, heat retention, heat resistance and corrosion resistance.

2. Description of the Related Art

It is known that metallic tubular members such as pipes and rings can be provided with heat insulating, heat resisting and corrosion resisting properties by forming a ceramic layer on the inner surfaces of the structures. In order to attain this object, composites are used that have a sintered ceramic joined with metallic tubular members by known techniques such as shrink fitting, expansion fitting, press fitting and bonding with an adhesive.

These techniques however have their own problems. If a low stress is applied in joining by shrink fitting or expansion fitting, the thermal expansion mismatch between metal and ceramic may cause loosening of the mating surfaces depending upon the temperature at which the composite is used. If, on the other hand, an excessively large stress is applied, the ceramic may fail. In addition to these problems, joining by press fitting or bonding with an adhesive reduces process efficiency because the inside and outside diameters of the members to be joined must be closely controlled.

An object of the present invention is to provide a heat-insulating metal-ceramic structure that can be produced at high efficiency and which can be used over a broad range of temperatures without causing the loosening of one mating surface from the other or failure of the ceramic part.

SUMMARY OF THE INVENTION

In order to achieve the above object, the present invention provides a heat-insulating tubular structure. The structure has a hollow metal outer tubular member surrounding a hollow inner tubular member comprised of a heat-resistant material. An annular space that is formed between the inner and outer tubular members is filled with a heat-resistant powder. The powder is retained by the tubular members and an annular-space sealing structure. Preferably the heat-resistant powder is comprised of magnesia, alumina, pyrophyllite, talc or mica powder. It is further preferred that the heat-resistant material of the hollow inner tubular member be a sintered ceramic. Finally, it is preferred that the annular-space sealing structure include an inwardly projecting rim on the inside of the outer tubular member and a sealing ring positioned between the inner and outer tubular members.

DESCRIPTION OF THE PREFERRED EMBODIMENTS

Figure 1:
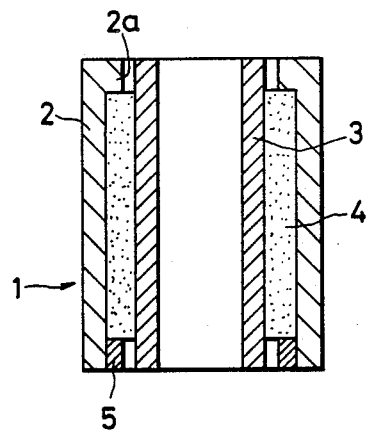
FIG. 1 is a cross section of a heat-insulating metal-ceramic structure according to one embodiment of the present invention.

With reference to FIGS. 1 through 4, a number of embodiments of the invention will be described. FIG. 1 is a cross section of a heat-insulating metal-ceramic structure according to one embodiment of the present invention. The metal-ceramic structure 1 consists of a tubular metallic member 2 having a rim 2a projecting inwardly at one end of the tubular member 2, a sintered silicon nitride cylinder 3 which is fitted in the tubular metallic member 2, and a ceramic powder 4 compacted in a gap between the mating surfaces of the metallic tubular member 2 and the sintered ceramic cylinder 3. The cylinder 3 has an outside diameter 0.2 mm smaller than the inside diameter of the rim 2a. A ring seal 5 with an inside diameter 0.2 mm larger than the outside diameter of the sintered cylinder 3 and with an outside diameter 0.1 mm larger than the inside diameter of the metal tube 2 is located at the end of the metallic tubular member 2 that is opposite the end with the rim 2a. The ring 5, made of stainless steel (SUS 403), is fitted into the end of the metal tube 2 at a pressure of 1.5 tons/cm$^2$. The ring cooperates with the rim 2a at the opposite end of the metal tube to prevent a spillage of the ceramic powder 4. The ceramic powder is held in the gap between the metallic member and the ceramic cylinder at a pressure of 1 ton/cm$^2$.

The ceramic powder 4 compacted in the gap between the metallic tubular member 2 and the hollow cylindrical ceramic sinter 3 has a sufficient resiliency to firmly bind the two members in a non-contact relationship. Heat conduction between the two members is blocked by the intervening powder 4 so that, even if there should exist a great difference between the thermal expansion coefficients of the two members, the metal-ceramic structure of the present invention can be used over a broad range of temperatures without the risk of one mating surface becoming loosened from the other due to a thermal expansion mismatch. Because the powder 4 will flow somewhat, the dimensional tolerances for the outside diameter of the sintered ceramic cylinder and the inside diameter of the metallic tubular member do not have to be closely controlled.

The ceramic powder 4 is desirably made of a heat-resistant or resilient material such as magnesia, alumina, pyrophyllite, talc or mica powder. It is desirable for these powders to be compacted between the tubular metallic member and the hollow sintered ceramic at a pressure of 500 kg/cm$^2$ or higher.

The structure 1 was subjected to a heat cycle test conducted in the following manner: the structure was mounted on a water-cooled holder and, while the outer surface of the metal tube 2 was cooled with water under vibration at 15 G, the assembly was subjected to 5,000 heat cycles each consisting of heating the inner surface of the sintered ceramic cylinder 3 with a burner at 800° C. for 2 minutes and cooling the same with air for 2 minutes. No crack occurred in the ceramic cylinder nor was there any loosening of the joint between the mating surfaces.

In the embodiment of FIG. 1, the ceramic cylinder 3 was fitted in the metal tube 2 at room temperature. In order to prevent the two members from, being misaligned before the packing of the ceramic powder 4, the ceramic cylinder 3 may be slightly shrink-fitted to the rim 2a of the metal tube 2 prior to the packing of the ceramic powder 4. The advantages of the embodiment of FIG. 1 are also obtained in this modification.

Figure 2:
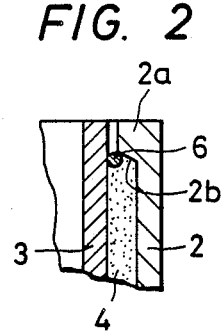
FIGS. 2 and 3 are cross sections showing the essential parts of heat-insulating metal-ceramic structures according to other embodiments of the present invention.

Another embodiment of the present invention is shown in FIG. 2, wherein a packing 6 is retained between a tapered inner surface 2b of the rim 2a and the outer surface of the ceramic cylinder 3. The distance between the ceramic cylinder 3 and the rim 2a in this embodiment is greater than that realized in the first embodiment yet the advantages of the embodiment of FIG. 1 are obtained with this embodiment.

Figure 3:
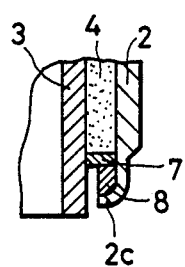

Methods for preventing a spillage of the ceramic powder 4 are not limited to the press fitting of the ring seal 5. As shown in FIG. 3, after compaction of the ceramic powder, an asbestos packing 7 and a retainer 8 may be placed in that order at the bottom of metal tube 2 to retain the powder. The packing 7 and retainer 8 are held by the clamping action of a thin-walled portion 2c of the metal tube 2. This method, as shown in FIG. 3, is also effective in preventing spillage of the ceramic powder 4.

Figure 4:
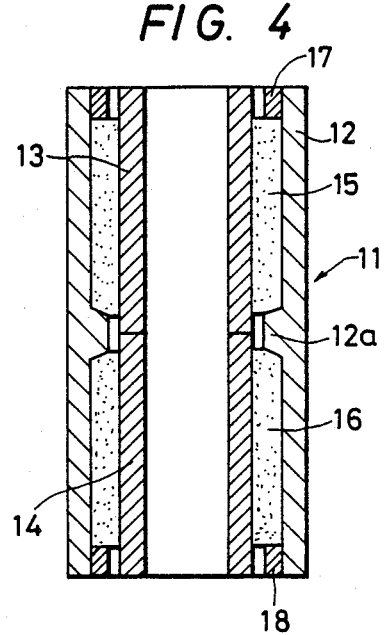
FIG. 4 is a cross section of a heat-insulating metal-ceramic structure according to still another embodiment of the invention.

FIG. 4 is a cross section showing a heat-insulating metal-ceramic structure in accordance with still another embodiment of the present invention. The structure 11 consists of a metal tube 12 having a rim 12a that projects inwardly from the inner surface of the middle of the metal tube. A pair of identically shaped sintered silicon carbide cylinders 13 and 14 that have an outside diameter 0.2 mm smaller than the inside diameter of the rim 12a are fitted in the metal tube 12 in such a manner that they are joined together end-to-end in substantially the middle of the metal tube.

Two layers of ceramic powder 15 and 16 that are compacted in the gaps between the pair of ceramic cylinders 13 and 14 and the metal tube 12 at a pressure of 1 ton/cm$^2$. Ring seals 17 and 18 are press-fit into the ends of the metal tube 12 so that, in cooperation with the center rim 12a, they prevent leakage or slippage of the layers of ceramic powder 15 and 16 from the assembly. The embodiment described above may be applied to the fabrication of an elongated metal-ceramic assembly wherein a plurality of rims 12a are formed on selected areas of the inner surface of an elongated tubular metallic member.

Although not shown, a further embodiment may be realized by fitting a plurality of tubular metallic members with an integral body of sintered silicon carbide. As in the case of the embodiment shown in FIG. 4, this modification is also useful in the fabrication of an elongated metal-ceramic assembly.

The heat-insulating metal-ceramic structure of the present invention permits a sintered ceramic cylinder and a tubular metallic member to be firmly bound to each other in a non-contact relationship over a broad temperature range. The invention provides a structure with improved heat insulation properties as well as improved heat retaining and heat resisting properties. In addition, the metal-ceramic structure of the invention can be fabricated at low cost because close control over the dimensional tolerances for the mating surfaces is not required.

What is claimed is:

1. A heat-insulating tubular structure comprising:
 a hollow outer tubular member comprised of metal;
 a hollow inner tubular member comprised of a sintered ceramic material, the inner tubular member being coaxially aligned within said hollow outer tubular member, said inner and outer tubular members defining an annular space therebetween;
 a heat-resistant powder, said powder compacted in the annular space between said hollow outer tubular member and said hollow inner tubular members and having a substantially uniform composition radially throughout the annular space, said powder binding said hollow inner tubular member to said hollow outer tubular member; and
 means for retaining said compacted powder within said annular space.

2. The heat-insulating tubular structure as recited in claim 1 wherein said heat-resistant powder is comprised of magnesia, alumina, pyrophyllite, talc or mica powder.

3. The heat-insulating tubular structure as recited in claim 1 or 2 wherein said hollow inner tubular member sintered ceramic material is silicon carbide or silicon nitride.

4. The heat-insulating tubular structure as recited in claim 3 wherein said retaining means comprises a rim projecting inwardly from said hollow outer tubular member, said rim closely surrounding the outer surface of said inner tubular member.

5. The heat-insulating tubular structure as recited in claim 4 wherein said retaining means further comprises a ring seal of a heat-resistant material, said ring seal disposed to surround said inner hollow tubular member in the annular space between said inner and outer tubular members, said ring seal cooperating with said inner tubular member, said outer tubular member and said inwardly projecting rim to retain said heat-resistant powder.

* * * * *